US012092433B2

(12) United States Patent
Kennedy

(10) Patent No.: US 12,092,433 B2
(45) Date of Patent: Sep. 17, 2024

(54) TASER SAFETY SYSTEM

(71) Applicant: James Kennedy, Fairfield, CA (US)

(72) Inventor: James Kennedy, Fairfield, CA (US)

( * ) Notice: Subject to any disclaimer, the term of this patent is extended or adjusted under 35 U.S.C. 154(b) by 215 days.

(21) Appl. No.: 17/934,646

(22) Filed: Sep. 23, 2022

(65) Prior Publication Data

US 2023/0105363 A1 Apr. 6, 2023

Related U.S. Application Data

(60) Provisional application No. 63/252,044, filed on Oct. 4, 2021.

(51) Int. Cl.

*F41H 13/00* (2006.01)
*F41B 11/62* (2013.01)
*G08B 13/14* (2006.01)

(52) U.S. Cl.

CPC .......... *F41H 13/0025* (2013.01); *F41B 11/62* (2013.01); *G08B 13/1472* (2013.01)

(58) Field of Classification Search

CPC ......................... F41H 13/0018; F41H 13/0025
See application file for complete search history.

(56) References Cited

U.S. PATENT DOCUMENTS 5,949,338 A 9/1999 Masi et al.
9,267,768 B1 2/2016 Chang
2011/0162514 A1* 7/2011 Osborne ............. F41H 13/0018 224/191
2012/0262293 A1* 10/2012 Brave ...................... H05C 1/04 361/232
2024/0068772 A1* 2/2024 Rye ....................... F41C 33/029

OTHER PUBLICATIONS

Axon, Taser X26P, retrieved from internet, retrieved on Sep. 23, 2022, <URL: https://www.axon.com/products/taser-x26p>.

J-Guard Security Products, Personal Stun Gun Stun Gun Flashlight Alarm Pepper Spray Keychain Self Defense Kit. Multi-Function Less Lethal Weapon Combo. Tactical Gear For Women Or Men While Walking , Camping or Hiking (PINK), retrieved from internet, retrieved on Sep. 23, 2022, <URL: https://www.amazon.com/Personal-Flashlight-Keychain-Multi-Function-Tactical/dp/B076P1N4Y5>.

Guard Dog Security, Hornet 2—Mini Stun Gun With LED Light and 120 DB Alarm, retrieved from internet, retrieved on Sep. 23, 2022, <URL: https://guarddog-security.com/products/hornet-2-black-stun-gun>.

* cited by examiner

*Primary Examiner* — Jared Fureman
*Assistant Examiner* — Christopher J Clark

(57) ABSTRACT

The present invention provides a taser alarm system that comprises a taser housing that includes laser sights, a red light, an alarm system, and a circuit board, a cartridge system, and a remote lock communicatively connected to the circuit board included in the taser housing, the remote lock includes a button that, when pressed, sends a signal to the circuit board to remotely turn on or off the taser alarm system.

18 Claims, 4 Drawing Sheets

TASER SAFETY SYSTEM

FIELD OF THE INVENTION

The present invention relates generally to a safety mechanism for a taser. More specifically, the present invention is a device that allows the taser to be quickly identified by the user, allows the taser to be locked remotely, and voice activated.

BACKGROUND OF THE INVENTION

The majority of police officers are armed with both a taser and a handgun while on and off working shifts. These two devices are a necessary in various situations where the police officer's life may be in harm's way and are needed for various situations throughout their day. Unfortunately, situations have occurred where a suspect or another person other than the police officer gets control of the taser and the officer is forced to use other means to subdue the suspect. Additionally, some officers have mistakenly pulled a handgun and shot a suspect when they believed they had pulled out a taser instead of a lethal weapon. Many of these situations occur in the heat of the moment when adrenaline is high and pure instincts take over, which then result in unfortunate deaths that could have otherwise been avoided if the right device was used or could be deactivated.

An objective of the present invention is to provide users with a taser alarm system with voice activation, to help the officer identify that they have pulled out their taser and not a lethal weapon. The present invention intends to provide users with a device that can also remotely deactivate the taser, ensuring the safety of the officer if the taser is taken away from the officer. In order to accomplish that, a preferred embodiment of the present invention comprises a taser housing, a cartridge system, and a remote lock. Further, the taser housing has several mechanisms to alert the user that the taser has been removed from the holster and is being used instead of a lethal weapon. Thus, the present invention is taser alarm system that ensures that the user knows they have withdrawn a taser from their holster and allows the user to deactivate the taser remotely if needed.

SUMMARY OF THE INVENTION

The present invention is a taser alarm system to help with avoiding confusion between a taser and lethal weapon during a heat of the moment situation. The present invention seeks to provide users with a device that can alert the user that a taser has been withdrawn and a remote lock to deactivate the taser. In order to accomplish this the present invention comprises a taser housing that comprises various alerting mechanism to ensure the user knows they have taken a taser out of their holster. Further, the cartridge system fires the electrical projectile that can be locked to ensure nothing is fired in certain situations. Additionally, the remote lock can utilize various technologies to communicate with the present invention, allowing it to be locked remotely if the taser if taken out of the possession of the police officer. Thus, the present invention is taser alarm system that ensures that the user knows they have withdrawn a taser from their holster and allows the user to deactivate the taser remotely if needed by voice or physical button.

DETAIL DESCRIPTIONS OF THE INVENTION

All illustrations of the drawings are for the purpose of describing selected versions of the present invention and are not intended to limit the scope of the present invention.

As shown in FIGS. 1-4, the present invention is taser alarm system 100. An objective of the present invention is to provide users with a taser that can be remotely shut off as needed with voice activation or a physical button.

The present invention intends to provide users with a device that alerts the user if the device has been taken out of the holster.

Figure 1:
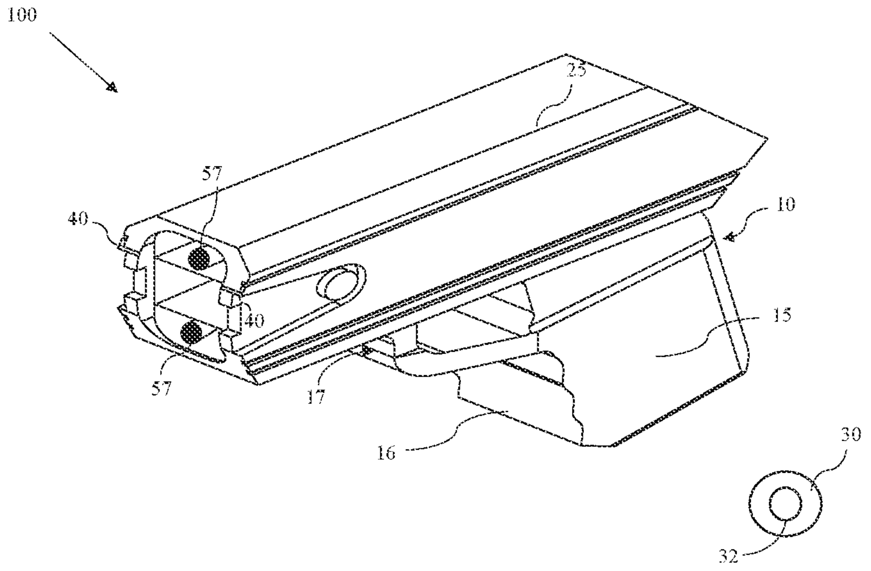
FIG. 1 is a perspective view of the present invention with a remote lock.

To accomplish this the present invention comprises a taser housing 10, cartridge system 25, and a remote lock 30, as shown in FIG. 1. Many of these components allow for the user to ensure they know they have the right device drawn and have not mistakenly drawn a lethal weapon when not intended.

The cartridge system 25 is located on top of the taser housing which can be locked by the unattached remote lock 30 (or the remote lock 30 detachably attached to any place on taser housing 10 by using Velcro attachments or any know fasteners). Thus, the present invention is a taser alarm system 100 that ensures that the user knows they have withdrawn a taser from their holster and allows the user to deactivate the taser remotely if needed.

Figure 4:
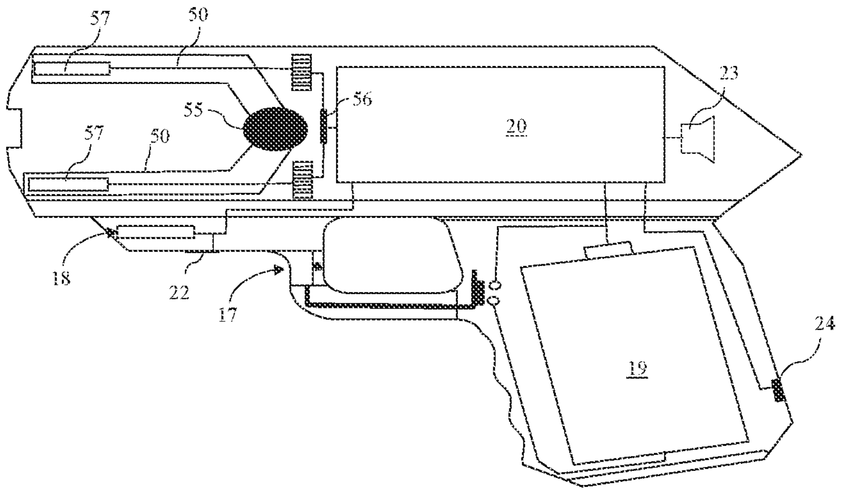
FIG. 4 is an illustration of one embodiment showing the inside of the present invention.

The present invention comprises mainly of the taser housing 10. The taser housing 10 is made of a durable material (such as, but not limited to, plastic and rubber) that has an L-like shape making the taser alarm system 100 easy to hold as shown in FIG. 4.

In its preferred embodiment the taser housing 10 comprises a handle 15, grip 16, a trigger 17, laser sights 18, battery 19, red light 22, alarm system 23, and circuit board 20.

In some embodiments, the taser housing 10 may include a dovetail receptor 40 for attaching the cartridge system 25.

The handle 15 can be shaped and configured for the user to manually grab and move the taser housing 10 from a holster (which can be any holster sized to fit the taser housing 10).

The trigger 17 is coupled to the taser housing 10 and located on the front inner side of the taser housing 10 as shown in FIG. 1. The trigger 17 can be made of a similar material with a curved shape allowing it to be easily pulled backwards by a finger.

Below the trigger 17 is the grip 16 that runs along the front side of the handle 15 that rests in the palm of the user. The taser housing 10 also comprises one or more laser sight 18 and a battery 19 that allows the taser housing 10 to be properly aimed at a target and powered for proper effect.

Laser sights 18 can be configured to emit beams that are directed along the expected flight paths of projectiles discharged from the taser housing 10.

In some embodiments, the taser housing 10 may include one or more laser sights 18 embedded in the taser housing 10, the laser sights 18 may include a beam generator and a collimating optic known in the art.

Positioned on the front of the trigger 17 is the red light 22. Once the taser housing 10 is removed from a holster, the red light 22 (which is preferably a LED light which may include at least one dice or chip LED mountable on a circuit board 20) can be activated that allows a police officer to have a visual indicator that a taser (taser housing 10) is being used and that the police officer do not have a lethal weapon drawn.

Additionally, to assist with ensuring the user knows if they have the taser withdrawn from the holster, the alarm system 23 will activate and the voice activator (which may be included in the alarm system 23) will notify the officer with the words "Taser" at least once.

In some embodiments, the alarm system 23 can be connected to one or more sensors 24 that sends a signal to the alarm system 23 when the taser housing 10 is withdrawn from a holster, the alarm system 23 makes a sound when the signal is received form the sensor 24. Such an alarm system 23 may include an audio alarm device known in the art.

Further, the circuit board 20 is also located within the taser housing 10 and controls both the red light 22 and alarm system 23 ensuring that both are activated and that the alarm system 23 creates a high-pitched noise for at least 3 to 4 minutes after being withdrawn.

It should be further noted that, the taser housing 10, shown in FIG. 1, can be created in many various shapes and sizes and the circuit board can be created with several variations while still staying within the scope of the present invention. The circuit board 20 can be any known type of circuit board that can control both the red light and alarm system.

Figure 2:
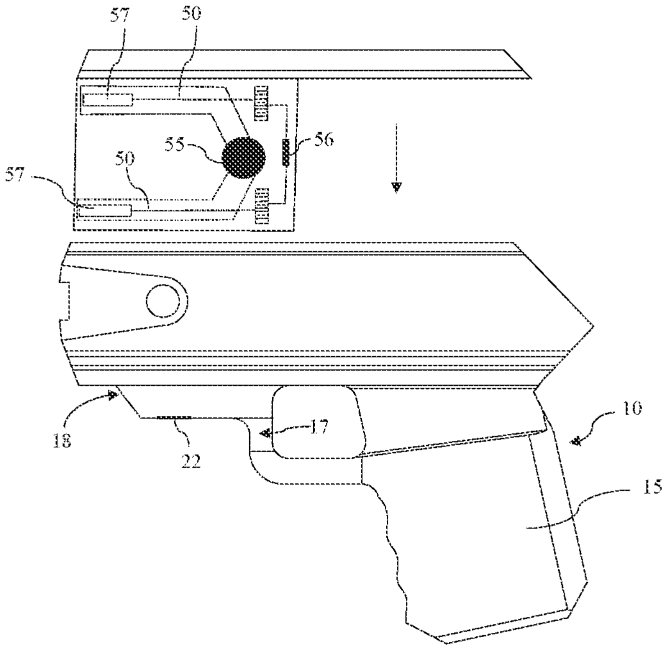
FIG. 2 is a side view of the cartridge system and the taser housing of the present invention.
Figure 3:
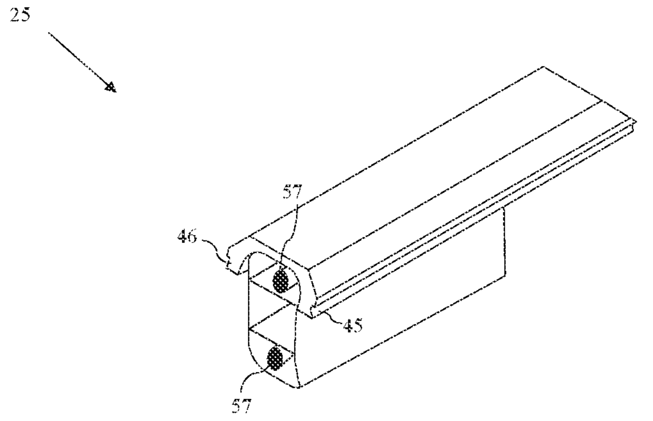
FIG. 3 is an illustration of one embodiment of the cartridge system of the present invention.

The cartridge system 25 connects to the top side of the taser housing 10 as shown in FIG. 2. In some embodiments, the cartridge system 25 may include a dovetail rail 45 for mounting to the taser housing 10, as shown in FIG. 3. Further, tapered sidewalls 46 of the dovetail rail 45 may extend along a longitudinal axis of the dovetail rail 45 and be spaced apart along an orthogonal transverse axis of the dovetail rail 45 in positions for engaging mating sidewalls of a dovetail receptor 40 in the taser housing 10.

In some embodiments, the cartridge system 25 can be attached to the taser housing 10 by pushing down the cartridge system 25 on to the taser housing 10. In such embodiments, dovetail rail 45 can be made of a flexible material so that the cartridge system 25 can be easily pushed down on to the taser housing 10.

The cartridge system 25 can also be attached to the taser housing 10 by sliding in the cartridge system 25 so that the dovetail rail 45 can engage the dovetail receptor 40 in the taser housing 10.

In its preferred embodiment the cartridge system 25 is replaceable and comprises an electrical barbed wire 50, gas propellant 55 and a safety lock 56. The electrical barbed wire 50 shoots out of the cartridge system 25 powered by the gas propellant 55 once the trigger 17 on the taser housing 10 is pulled.

For example, cartridge system 25 may include two charge electrodes 57 positioned at the ends of the electrical barbed wires 50, attached to the gun's electrical circuit board 20. Pulling the trigger 17 breaks open a compressed gas inside the cartridge system 25. The expanding gas builds pressure behind the charge electrodes 57, launching them through the air, the attached electrical barbed wires 50 trailing behind.

This design allows for the electrical barbed wire 50 to subdue a suspect without the need for lethal force. Additionally, the cartridge system 25 contains a safety lock 56 that is controlled by the circuit board 20 of the taser housing 10. This safety lock 56 is designed to prevent the electrical barbed wire 50 from deploying from the cartridge system 25 when it is not supposed to launch.

The remote lock 30 communicates with the circuit board 20 of the taser housing 10 through remote technology. In its preferred embodiment the remote lock 30 comprises a button 32 as seen in FIG. 1. The button 32 is designed with a circular shape and can be pressed inwards triggering the safety lock 56 on the cartridge system 25 to activate. The safety lock 56 can be any electrical lock that is configured to shut off/lock the cartridge system 25 through the control of the circuit board 20.

This design allows the police officer to remotely shut off the taser (taser housing 10), rendering the taser temporarily useless if an individual is able to take the taser away from the police officer. As the button 32 is pressed, a Bluetooth or Wi-Fi signal can be sent from the remote lock 30 to the circuit board 20, allowing the taser to be remotely turned on or off. With all the components working in tandem with each other it can be seen that the present invention is taser alarm system 100 that ensures that the user knows they have withdrawn a taser from their holster and allows the user to deactivate the taser remotely if needed.

Although the invention has been explained in relation to its preferred embodiment, it is to be understood that many other possible modifications and variations can be made without departing from the spirit and scope of the invention.

What is claimed is:

1. A taser alarm system comprising:

a taser housing having an L-like shape including:
- a handle,
- a dovetail receptor,
- a trigger coupled to the taser housing,
- a grip that runs along the front side of the handle,
- one or more laser sights embedded in the taser housing, the laser sights include a beam generator and a collimating optic,
- a red light,
- an alarm system,
- a circuit board connected to the alarm system and the red light,
- the circuit board positioned inside the taser housing, and
- a battery connected to the circuit board;

a cartridge system positioned on the taser housing, the cartridge system including:
- a dovetail rail for mounting to the taser housing,
- tapered sidewalls of the dovetail rail extending along a longitudinal axis of the dovetail rail and being spaced apart along an orthogonal transverse axis of the dovetail rail in positions for engaging mating sidewalls of the dovetail receptor,
- at least one electrical barbed wire,
- a gas propellant, and
- a safety lock connected to the circuit board; and a remote lock removably attached to the taser housing, the remote lock communicatively connected to the circuit board, the remote lock includes a button that, when pressed, sends a signal to the circuit board to remotely turn on or off the taser alarm system.

2. The taser alarm system as claimed 1, wherein the taser housing is made of a durable material.

3. The taser alarm system as claimed 1, wherein the red light is a LED light.

4. The taser alarm system as claimed 1, wherein the trigger includes a curved shape.

5. The taser alarm system as claimed 1, wherein the alarm system is configured to create a high-pitched noise for at least 3 to 4 minutes.

6. The taser alarm system as claimed 1, wherein the alarm system is connected to a sensor that sends a signal to the alarm system when the taser housing is withdrawn from a holster, the alarm system makes a sound when the signal is received form the sensor.

7. A taser alarm system comprising:
- a taser housing having an L-like shape including:
  - a handle,
  - a dovetail receptor,
  - a trigger having a curved shape, coupled to the taser housing,
  - a grip that runs along the front side of the handle,
  - one or more laser sights,
  - a red light,
  - an alarm system having a voice activator,
  - a circuit board connected to the alarm system and the red light,
  - the circuit board positioned inside the taser housing, and
  - a battery connected to the circuit board;
- a cartridge system removably attached to the taser housing, the cartridge system including:
  - a dovetail rail for mounting to the taser housing,
  - tapered sidewalls of the dovetail rail extending along a longitudinal axis of the dovetail rail and being spaced apart along an orthogonal transverse axis of the dovetail rail in positions for engaging mating sidewalls of the dovetail receptor,
  - at least one electrical barbed wire,
  - a gas propellant,
  - at least one charge electrode connected to the at least one electrical barbed wire, and
  - a safety lock connected to the circuit board; and
- a remote lock removably attached to the taser housing, the remote lock communicatively connected to the circuit board, the remote lock includes a button that, when pressed, sends a signal to the circuit board to remotely turn on or off the taser alarm system.

8. The taser alarm system as claimed 7, wherein the taser housing is made of a durable material.

9. The taser alarm system as claimed 7, wherein the red light is a LED light.

10. The taser alarm system as claimed 7, wherein the alarm system is configured to create a high-pitched noise for at least 3 to 4 minutes.

11. The taser alarm system as claimed 7, wherein the alarm system is connected to a sensor that sends a signal to the alarm system when the taser housing is withdrawn from a holster, the alarm system makes a sound when the signal is received form the sensor.

12. The taser alarm system as claimed 7, wherein the circuit board is connected to a sensor that sends a signal to the circuit board when the taser housing is withdrawn from a holster, the circuit board makes a sound when the signal is received from the sensor.

13. A taser alarm system comprising:
- a taser housing having an L-like shape including:
  - a handle,
  - a dovetail receptor,
  - a trigger having a curved shape, coupled to the taser housing,
  - a grip that runs along the front side of the handle,
  - one or more laser sights,
  - a red light,
  - an alarm system,
  - a circuit board connected to the alarm system and the red light,
  - the circuit board positioned inside the taser housing, and
  - a battery connected to the circuit board;
- a cartridge system positioned on the taser housing, the cartridge system including:
  - a dovetail rail for mounting to the taser housing,
  - tapered sidewalls of the dovetail rail extending along a longitudinal axis of the dovetail rail and being spaced apart along an orthogonal transverse axis of the dovetail rail in positions for engaging mating sidewalls of the dovetail receptor,
  - two electrical barbed wires,
  - a gas propellant,
  - two charge electrodes connected to the electrical barbed wires, and
  - a safety lock connected to the circuit board; and
- a remote lock removably attached to the taser housing, the remote lock wire—connected to the circuit board, the remote lock includes a button that, when pressed, sends a signal to the circuit board to remotely turn on or off the taser alarm system.

14. The taser alarm system as claimed 13, wherein the taser housing is made of a durable material.

15. The taser alarm system as claimed 13, wherein the red light is a LED light.

16. The taser alarm system as claimed 13, wherein the alarm system is configured to create a high-pitched noise for at least 3 to 4 minutes.

17. The taser alarm system as claimed 13, wherein the alarm system is connected to a sensor that sends a signal to the alarm system when the taser housing is withdrawn from a holster, the alarm system makes a sound when the signal is received form the sensor.

18. The taser alarm system as claimed 13, wherein the circuit board is connected to a sensor that sends a signal to the circuit board when the taser housing is withdrawn from a holster, the circuit board makes a sound when the signal is received from the sensor.

* * * * *